US010039265B2

(12) United States Patent
Kruijff et al.

(10) Patent No.: US 10,039,265 B2
(45) Date of Patent: Aug. 7, 2018

(54) EXERCISING AND AMUSEMENT SYSTEM FOR ANIMALS

(71) Applicant: Landgoed Hoenderdaell B.V., Anna Paulowna (NL)

(72) Inventors: Robert Peter Martinus Kruijff, Anna Paulowna (NL); Volkert Cornelis Johannes Deen, Zuid Scharwoude (NL)

(73) Assignee: Landgoed Hoenderdaell B.V., Anna Paulowna (NL)

( * ) Notice: Subject to any disclaimer, the term of this patent is extended or adjusted under 35 U.S.C. 154(b) by 238 days.

(21) Appl. No.: 15/073,885

(22) Filed: Mar. 18, 2016

(65) Prior Publication Data

US 2016/0270372 A1  Sep. 22, 2016

(30) Foreign Application Priority Data

Mar. 19, 2015 (NL) ...................................... 2014488

(51) Int. Cl.
*A01K 15/02* (2006.01)

(52) U.S. Cl.
CPC .......... *A01K 15/027* (2013.01); *A01K 15/025* (2013.01)

(58) Field of Classification Search
CPC ..... A01K 15/02; A01K 15/027; A01K 15/025
USPC ........ 119/702, 707, 708, 711, 701; 242/388, 242/388.6, 388.7, 390, 563
See application file for complete search history.

(56) References Cited

U.S. PATENT DOCUMENTS

| | | | |
|---|---|---|---|
| 3,312,195 A | 4/1967 | Rohena | |
| 3,924,855 A * | 12/1975 | Pretorius | A63B 69/0084 473/430 |
| 4,072,313 A * | 2/1978 | Murso | F41J 7/02 273/359 |
| 4,240,592 A * | 12/1980 | Russo | A63B 69/0079 242/387 |
| 4,601,261 A * | 7/1986 | Genelin | A01K 15/027 119/839 |
| 4,799,981 A * | 1/1989 | Stone | G05B 19/353 156/361 |

(Continued)

FOREIGN PATENT DOCUMENTS

| | | |
|---|---|---|
| DE | 4008036 A1 | 9/1991 |
| FR | 2730420 A1 * | 8/1996 ........... A01K 15/027 |

OTHER PUBLICATIONS

English-language translation of FR 2730420 A1.*
Search Report and Written Opinion for NL2014488; dated Nov. 18, 2015.

*Primary Examiner* — Lisa L Tsang
(74) *Attorney, Agent, or Firm* — Hoffmann & Baron, LLP

(57) ABSTRACT

A system for exercising and amusing animals includes at least three peripheral supports which are elevated above a floor, where the floor the peripheral supports are spaced apart from one another, where each peripheral support is associated with a respective motorized winch, and where a cable is spooled on each winch, a movable central member, where, for each winch, the corresponding cable extends from the winch via a respective peripheral support to the movable central member, a bait device configured to hold a bait, the bait device being provided at a distance (D) below the movable central member, and a control unit associated with the winches and configured to control each winch to wind or unwind the corresponding cable for moving the bait device.

17 Claims, 7 Drawing Sheets

(56) References Cited

U.S. PATENT DOCUMENTS

| | | | |
|---|---|---|---|
| 5,103,770 A | | 4/1992 | Berkovich |
| 5,474,032 A | * | 12/1995 | Krietzman ............ A01K 15/025 |
| | | | 119/708 |
| 6,314,913 B1 | | 11/2001 | Lettau et al. |
| 6,343,996 B1 | * | 2/2002 | Gasseling ........... A63B 69/0079 |
| | | | 473/142 |
| 2009/0314873 A1 | * | 12/2009 | Schmid ................ B21C 47/003 |
| | | | 242/534 |
| 2014/0367284 A1 | * | 12/2014 | Wurth .................. A01K 15/025 |
| | | | 206/223 |
| 2015/0201586 A1 | * | 7/2015 | Wolfgram ............ A01K 15/025 |
| | | | 119/707 |

* cited by examiner

EXERCISING AND AMUSEMENT SYSTEM FOR ANIMALS

CROSS-REFERENCE TO RELATED APPLICATIONS

This application claims the benefit of Netherlands Application No. NL 2014488, filed Mar. 19, 2015, the contents of which is incorporated by reference herein.

FIELD OF THE INVENTION

The present invention relates to an exercising and amusement system for animals. The system can be used for exercising animals while also letting the animals enjoy themselves. The system may further be used for feeding animals. The system may also be used to provide entertainment to spectators who watch the animals.

BACKGROUND OF THE INVENTION

Many zoos have predatory animals such as lion, tigers, pumas, panther, lynxes, wolves, hyenas etc. Often these animals spend a large part of the day sleeping or resting. Often the animals get very little exercise, and the only exercise that these animals get is a standard walk which is repeated over and over. Typically, the standard walk is located in front of the fence.

This situation is very remote from a natural environment, in which predators have to hunt for food and automatically stay fit as a result of the hunt.

The lack of exercise is bad for the physical and mental health of the animals, and also tends to make the spectacle somewhat boring for visitors of the zoo. The animals which are most impressive in physique are often the most boring to watch.

In the past, certain exercise systems have been used for predators. One system was derived from dog races and comprised a rail along which a bait was moved at high speed. However, in a zoo the animals do not have a predefined starting position as in a dog race. It was found in practice that the animals were smart enough to understand that the bait would stop moving at the end of the rail. The animals simply waited at the end of the rail to grab the bait.

Another system is known from U.S. Pat. No. 3,312,195. This system is cumbersome, relatively slow and not very sturdy. The movements of the bait are quite limited. The system is in particular not very suitable for large cats such as lion.

Another system is known from U.S. Pat. No. 6,314,913. This is a gadget which is suitable for pets, but completely unfit for zoos and large predators.

OBJECT OF THE INVENTION

It is an object of the invention to provide a system which lets animals, in particular large predatory animals such as lions, exercise.

It is an object of the invention to provide a system which lets animals, in particular predatory animals, show at least a part of their natural hunting behaviour.

It is an object of the invention to provide a system which is suitable to provide entertainment to visitors of a zoo.

It is a further object of the invention to provide an exercise system for animals which provides fast and reliable three dimensional movement of a bait above a floor.

It is a further object of the invention to provide an exercise system for animals which can be installed in a hall having a relatively low ceiling.

It is a further object of the invention to provide an exercise system for animals which can be installed in an existing zoo.

It is yet a further object of the invention to provide an alternative system for exercising and amusing animals to the prior art.

SUMMARY OF THE INVENTION

In order to achieve at least one object, the invention provides a system for exercising and amusing animals, in particular predators, the system comprising:
  at least three peripheral supports which are elevated above a floor on which the animals move, wherein when seen in top view of the floor the peripheral supports are spaced apart from one another and together define an exercise area, wherein each peripheral support is associated with a respective motorized winch, and wherein a cable is spooled on each winch,
  a movable central member, wherein, for each winch, the corresponding cable extends from the winch via a respective peripheral support to the movable central member, whereby the movable central member is suspended from the cables above the floor,
  a bait device configured to hold a bait, the bait device being provided at a distance below the movable central member,
  a control unit associated with the winches and configured to control each winch to wind or unwind the corresponding cable for moving the bait device in the exercise area.

The system allows movement of the bait device in a horizontal X-direction, a horizontal Y-direction and a vertical Z-direction, i.e. in three directions. This stimulates the animals to run across the exercise area and jump to get the bait. The bait simulates a prey and the animals enjoy chasing it. The animals get a better health as a result of the exercise The spectators enjoy watching the animals running and chasing the bait. The system may also be used for feeding the animals It was found that the arrangement is sturdy and allows very dynamic movements.

The position of the bait device below the central movable member prevents the predators from grapping the central movable member or the cables connected to the central movable member. These cables may extend substantially horizontally. If the central member would be too low, an animal could hang with its full weight on these cables or on the central movable member. As a direct consequence, one or more cables could break. This would result in damage to the system and possibly in injury of the animal. With the present invention, the animals can only reach the bait device, which considerably mitigates that risk.

The bait may be a piece of meat or another bait such as a toy or fake animal. The bait device may be a clamp which is under pretension by a spring. The bait device may also be a hook or another kind of bait device suitable to hold a piece of meat or other kind of bait.

In an embodiment, the system comprises an upper support and an associated motorized bait device winch, wherein a bait device cable is spooled on the bait device winch, wherein the bait device cable extends from the bait device winch via the upper support and via the central member to the bait device, wherein the bait device is movable in a vertical direction relative to the central member by winding or unwinding the bait device cable by the bait device winch.

The upper support will generally be positioned about centrally above the exercise area, but the position may be somewhat offset from the center necessary.

This embodiment allows a very dynamic movement of the bait device in three dimensions by winding and unwinding the cables, while preventing the predators from grabbing any substantially horizontal cables.

In an embodiment, only a limited available height is required which allows the system to be installed in a hall having a relatively low ceiling. Of course the system can also be installed in a hall having a high ceiling.

The central member may comprises a cable guide, in particular a ring, and wherein the bait device cable extends from the bait device winch via the upper support and through the cable guide to the bait device and has a freedom of movement relative to the cable guide in order to vary the vertical Z-position of the bait relative to the central member. The cable guide was found to be sturdy and suitable for large cats and other predators and create a dynamic vertical displacement of the bait device. The bait device may move freely in a vertical Z-direction relative to the movable central member.

The upper support may be located higher than the peripheral supports and centrally above the floor. It was found that this arrangement allows effective motion control in X, Y, Z.

The control unit may be configured to maintain the movable central member above a predetermined minimal height (H) above the floor in order to prevent the animals from reaching the movable central member. This prevents the predators from reaching the central member and the cables attached to it.

The movable central member may be maintained at a relatively constant altitude above the floor and is essentially only moved in an X-direction and Y-direction, and wherein the movement of the bait device in the Z-direction is only achieved with the bait device winch and the bait device cable. This separation of functions was found to improve the overall control The control unit may be configured to control the unwinding winches on the basis of a target torque and to control the winding winches on the basis of a target speed. This prevents the unwinding cable from going slack while at the same time allowing the winding winches to move the central member at a substantial horizontal speed.

The control unit may be configured to control the bait device winch on the basis of a target speed, regardless whether the bait device winch winds or unwinds the bait device cable. It was found that this provides efficient vertical control of the bait device.

The system may comprise a user input device which is connected to the control unit, wherein a user manually controls the movement of the bait in the X, Y and Z direction with the user input device. The user input device may comprise a joystick configured for controlling the horizontal X-position and Y-position of the bait device and an additional user input control for controlling the vertical Z-position of the bait device. The user device makes the entire system very user friendly.

Each winch may comprise:
a motor,
a motor controller,
a spool for the cable,
a transmission arranged between the motor and the spool.

Each winch may comprise a position sensor for measuring a rotational position of the winch, and wherein the control unit is configured for receiving position data from the position sensors and configured to compute the current lengths of the cables and to determine the current X and Y position of the movable central member and the current X, Y, Z position of the bait device on the basis of the position data. This embodiment allows a simple and effective control of the position of the bait device.

The control unit may be configured to determine a target X, Y, Z position of the bait device on the basis of the current position of the bait device and the user input with the user input device.

The control unit may send control data to each winch, wherein the control data comprises speed data relating to the target speed of the winch and torque data relating to the target torque of the winch, and wherein the motor controller of the winch is constructed to control the motor of the winch on the basis of the target speed when winding the cable and on the basis of the target torque when unwinding the cable.

For each winch which is associated with a peripheral support, a check may be performed whether the winch is winding or unwinding the cable, and wherein in the case of winding the cable the motor controller controls the motor of the winch the basis of the target speed and wherein in the case the winch is unwinding the cable the motor controller controls the motor of the winch on the basis of the target torque.

The system may comprise four peripheral supports and four winches associated with a respective peripheral support, and wherein the exercise area is square or rectangular. The system may comprise three peripheral supports and three winches associated with a respective peripheral support, wherein the exercise area is triangular. These two types of arrangements were found to effective.

The central member may be free of any electronics, gyroscopic devices or cameras and wherein the cable are free of any electric wiring. The bait device may be free of any electronics, gyroscopic devices or cameras. This keeps the system simple and avoids damage when the animal grabs the bait device.

The bait device winch which is associated with the upper support may be positioned to the side of the exercise area, when seen in top view. The bait device winch may be positioned at the same level as the other winches, to allow good access for maintenance.

The control unit may be configured to maintain the cables associated with the peripheral supports at an angle of less than 10 degrees to the horizontal.

The control unit may be configured to verify if the target position of the central member lies within a predefined safe area defined by a first safety boundary, in which case the speeds of the winches associated with the peripheral supports are maintained at their maximal values, and to verify if the target position lies in a slow-down area which extends around the safe area and which lies between the first safety boundary and a second, wider safety boundary, and to slow down the speed of the central member in a direction away from the first safety boundary on the basis of a distance of the central member to that first safety boundary, and to completely stop the movement of the central member in a direction away from the second safety boundary when the target position of the central member lies outside the second safety boundary, and to abort the operation of the system if the target position of the central member lies outside an even wider, third safety boundary which is defined by the position of the peripheral supports. This embodiment effectively prevents overloads on the system while at the same time largely preventing abrupt breakdowns of the systems The present invention further relates to a method of exercising or amusing animals, in particular predators, the method comprising:
  providing the system of the present invention, and connecting a bait to the bait device, and
  moving the bait device in the X-direction, Y direction and Z-direction with the winches.

The method may comprise:
  moving the bait in the horizontal X-direction and Y-direction with the cables and the winches associated with the peripheral supports, while maintaining the central member at a relatively constant altitude (H1) above the ground, and
  moving the bait in the vertical Z-direction with the bait device cable and the bait device winch.

The method may comprise maintaining the cables which are associated with the peripheral supports at an angle of less than 10 degrees to the horizontal.

The bait device may follow an irregular trajectory through the exercise area.

These and other aspects of the invention will be more readily appreciated as the same becomes better understood by reference to the following detailed description and considered in connection with the accompanying drawings in which like reference symbols designate like parts.

DETAILED DESCRIPTION OF THE INVENTION

Figure 1:
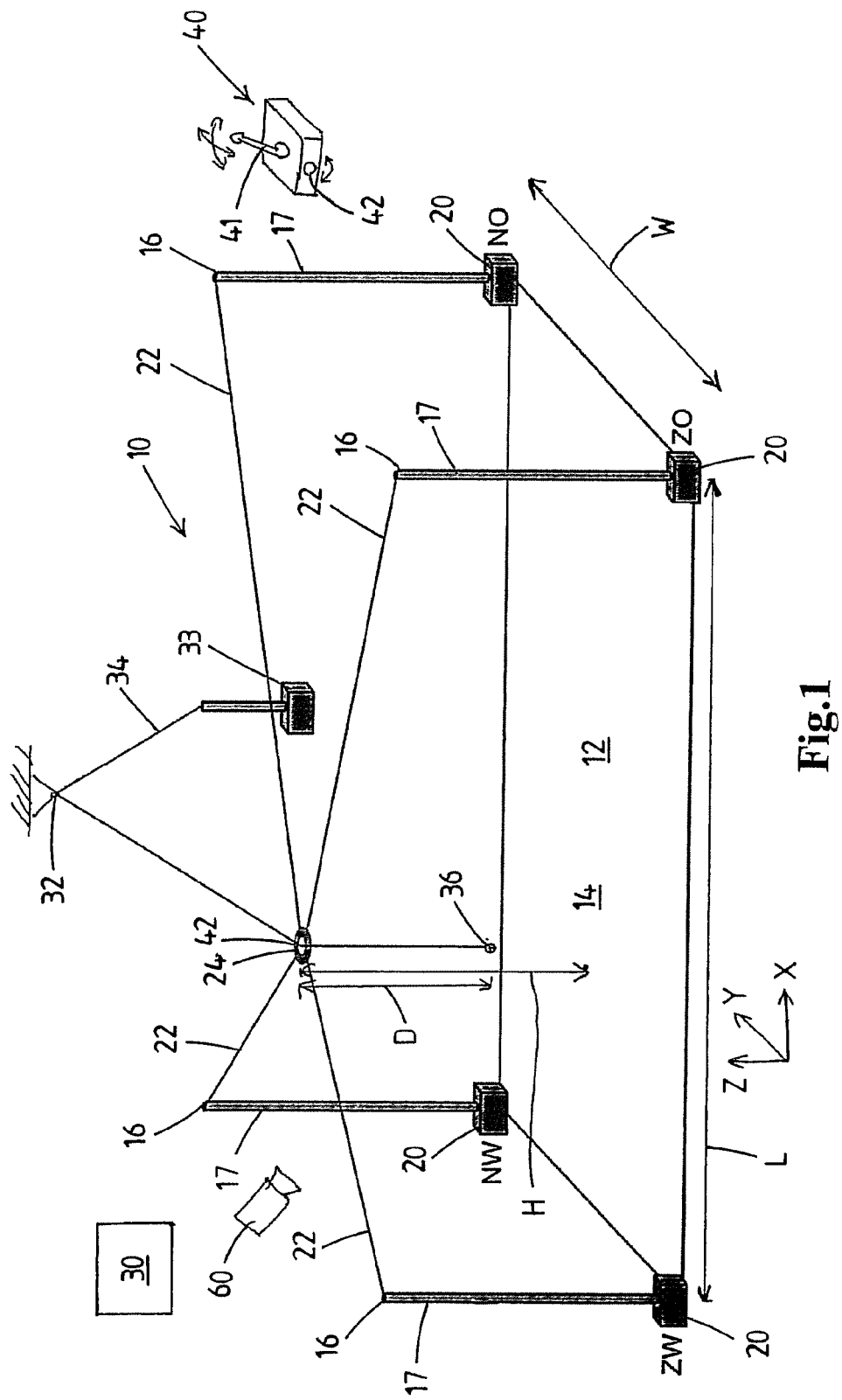
FIG. 1 shows an isometric view of the system according to the invention.

Turning to FIG. 1, the system 10 for exercising and amusing animals, in particular predators, of the present invention is intended to be installed in a zoo or other place where animals stay. The system 10 is installed above a floor 12 on which the animals walk. The exercise area 14 roughly coincides with the floor. The exercise area 14 may have a substantial width W and a substantial length L. The exercise area 14 may have a width of 5-100 meter and a length of 5-100 meter, in particular a width and length of 5-50 meter.

A coordinate system with an X-axis, Y axis and Z-axis is defined, wherein the Z-axis is the vertical direction.

The system 10 comprises at least three peripheral supports 16 which are elevated above the floor 12. The peripheral supports 16 may comprise a mast 17 and a pulley attached to the upper end of the mast. When seen in top view, the peripheral supports 16 are spaced apart from one another and together define the exercise area 14. There are a minimum of three peripheral supports, and in particular four peripheral supports. Three peripheral supports result in a triangular exercise area and four peripheral support result in a square or rectangular exercise area.

Each peripheral support 16 is associated with a respective motorized winch 20, and a cable 22 is spooled on each winch 20. The system 10 further comprises a movable central member 24. The central member 24 is free of any electronics, gyroscopic devices or cameras and the cables 22 are free of any electric wiring.

For each winch, the corresponding cable 22 extends from the winch via a respective peripheral support 16 to the movable central member 24. The movable central member 24 is suspended from the cables above the floor. The movable central member may be suspended at an altitude of at least 4 meter. The altitude may be adapted to the kind of animals, and chosen such that the animals cannot reach the movable central member by jumping.

The system further comprises a bait device 36 configured to hold a bait, the bait device being provided at a distance D below the movable central member.

The system further comprises a control unit 30 associated with the winches 20 and configured to control each winch 20 to wind or unwind the corresponding cable 22 for moving the bait device in the exercise area.

The system further comprises an upper support 32 which may be attached to the ceiling or to an arm above the exercise area.

The upper support 32 may alternatively be supported by upper cables. In this embodiment the masts 17 may each comprise a mast extension which extends above the peripheral supports 16 and forms a support for the upper cables.

The upper support 32 is generally arranged centrally above the exercise area, but may be arranged slightly offset from the center. The upper support 32 is located higher than the peripheral supports, for instance 1-5 meter higher.

The upper support may comprise a pulley. The system 10 further comprises an associated motorized bait device winch 33, wherein a bait device cable 34 is spooled on the bait device winch. The bait device cable 34 extends from the bait device winch 33 via the upper support 32 and via the central member 24 to the bait device 36, wherein the bait device 36 is movable in a vertical direction Z relative to the central member 24 by winding or unwinding the bait device cable 34 by the bait device winch 33. The bait device 36 is free of any electronics, gyroscopic devices or cameras.

The system further comprises a user input device 40 which is connected to the control unit 30 via a line or wireless. The user manually controls the movement of the bait device 36 in the X, Y and Z direction with the user input device. The user input device 40 comprises a joystick 41 configured for controlling the horizontal X-position and Y-position of the bait device and an additional user input control 42 for controlling the vertical Z-position.

The central member 24 comprises a cable guide 42, in particular in the form of a ring. The bait device cable 34 extends from the bait device winch 33 via the upper support 32 through the cable guide 24 to the bait device 36 and has a freedom of movement relative to the cable guide 42 in order to vary the vertical Z-position of the bait device relative to the central member.

The bait device is not supported in the vertical Z-direction by the movable central member, but only in the horizontal X and Y direction.

The control unit 30 is configured to maintain the movable central member 24 above a predetermined minimal height H above the floor in order to prevent the animals from reaching the movable central member 24.

Figure 2:
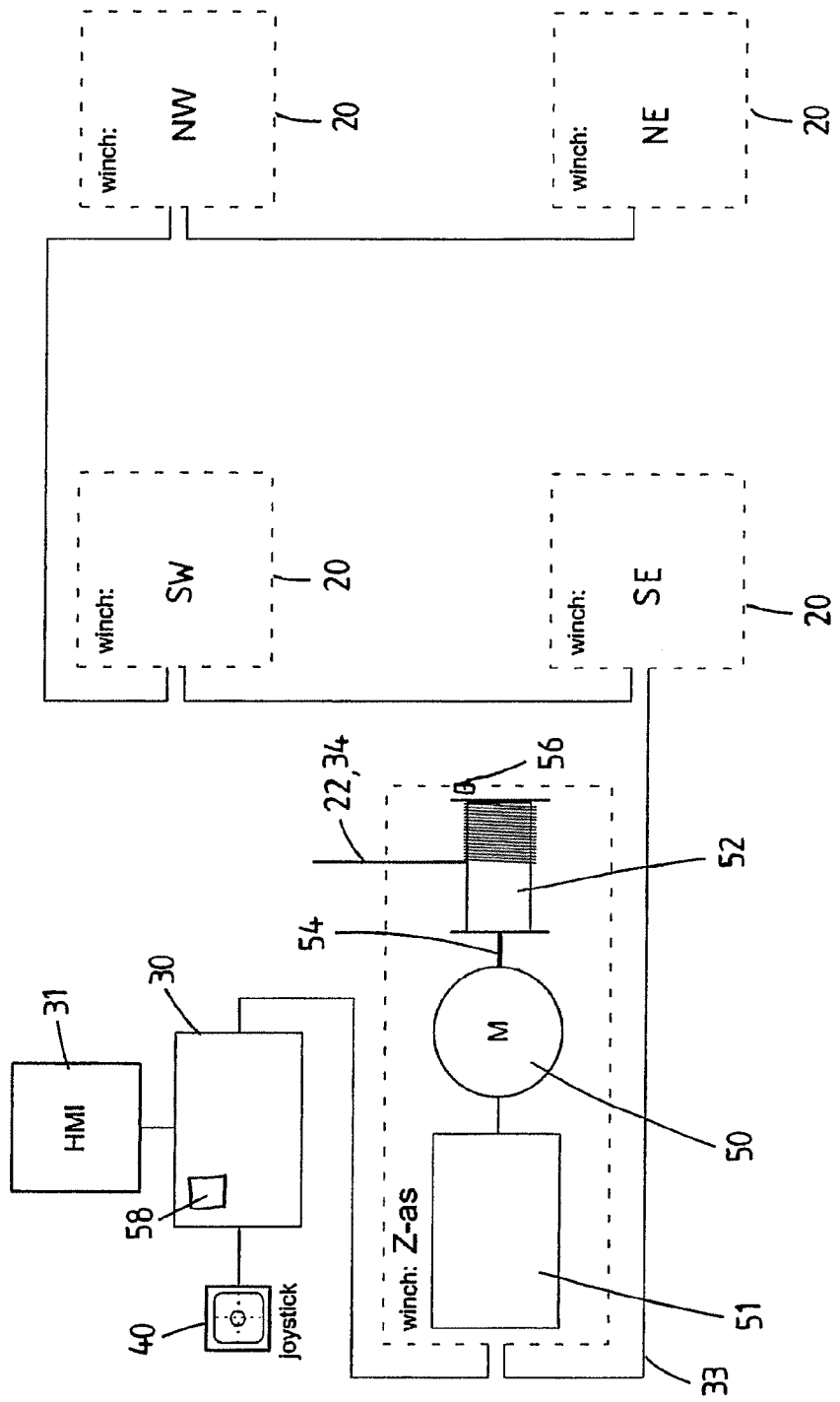
FIG. 2 shows a schematic view of the system.

Turning to FIG. 2, the each winch 20 comprises:
a motor (50),
a motor controller (51),
a reel (52) for the cable, and
a transmission (54) arranged between the motor and the reel.

The motors of the winches may be electric, pneumatic or hydraulic, but electric motors are preferred.

Each winch comprises a position sensor 56 for measuring a rotational position of the winch. The control unit 30 is configured for receiving position data from the position sensors 56 and configured to compute the lengths of the cables 22, 34 and to determine the current X and Y position of the movable central member 24 and the current X, Y, Z position of the bait device 36 on the basis of the position data. Optionally, an additional sensor may be applied which measures the angles of the cables 22 relative to a horizontal plane. In this case, the angle data are also fed to the control unit 30. In this way the current X and Y position of the movable central member 24 and consequently the X, Y and Z position of the bait device 36 can be determined more accurately.

The peripheral winches 20 are indicated with South West (SW), North West (NW), North East (NE) and South East (SE).

The control unit 30 is configured to determine a trajectory of the bait device on the basis of:
user input with the user input device 40, or
a predefined movement schedule which is stored in a memory 58 of the control unit, or
a position of the at least one animal, wherein said animal position is measured by an animal sensor 60 (see FIG. 1).

A Human Machine Interface 31 is coupled to the control unit 30. The control unit may comprise an algorithm which is stored in the memory of the control unit and which determines the trajectory on the basis of the measured animal position. The animal sensor 60 may be a camera.

Figure 3:
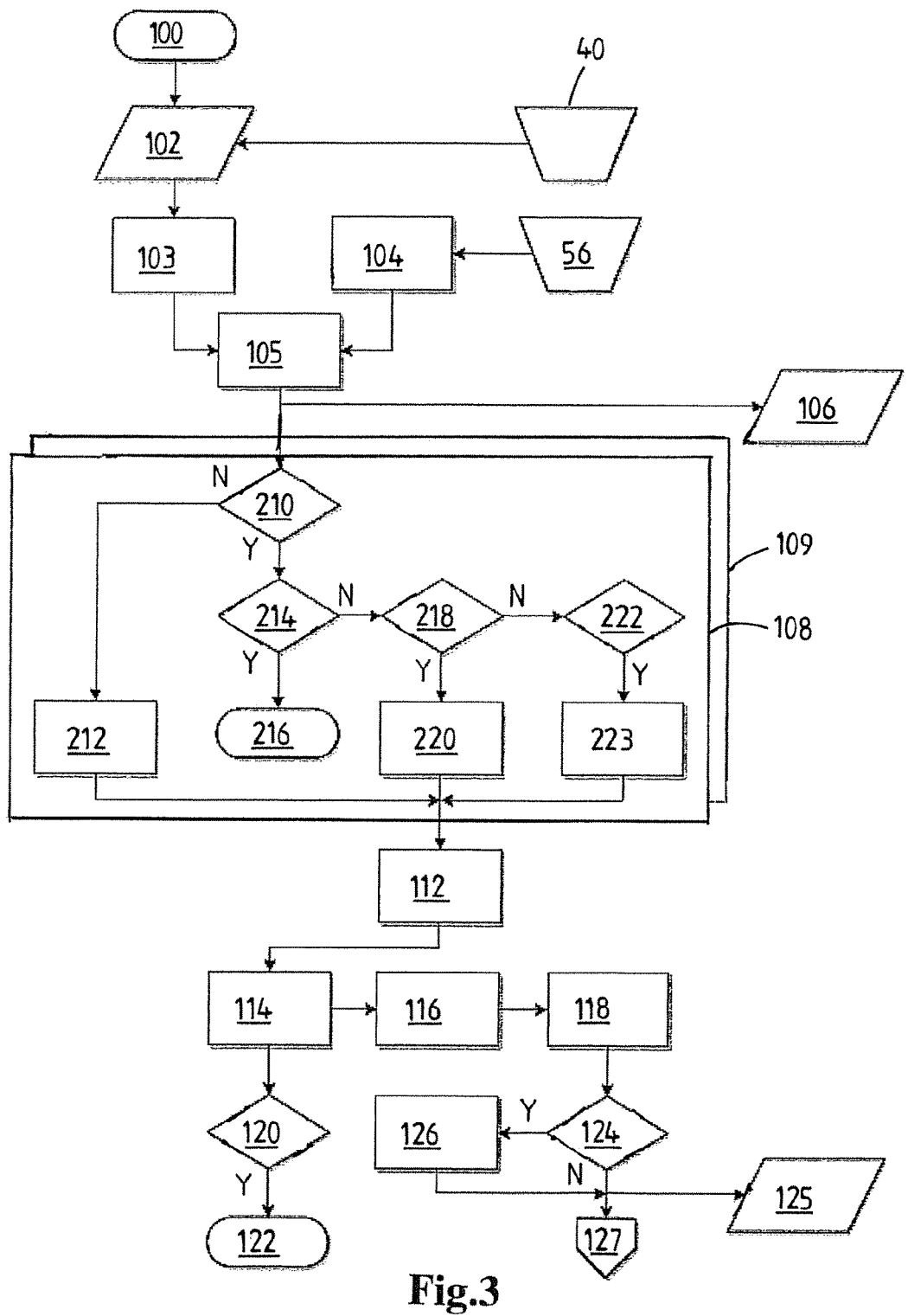
FIG. 3 shows a apart of a control diagram of the system.
Figure 4:
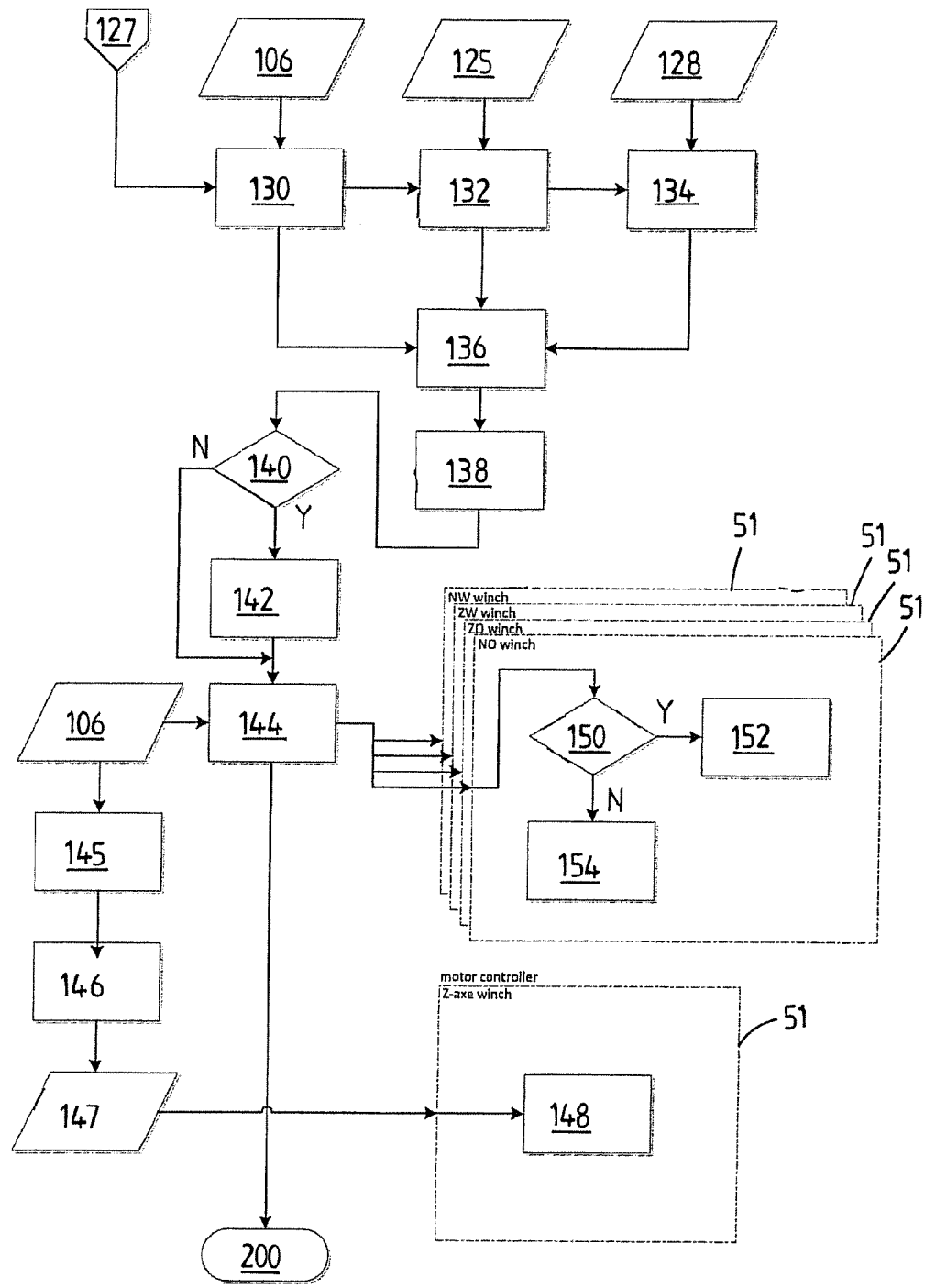
FIG. 4 shows another part of a control diagram of the system.

Turning to FIGS. 3 and 4, a diagram of the control procedure of the system 10 is shown. The control procedure is a cycle which is repeated multiple times. The control procedure has a start 100 and an end 200. First, the input is received from the user input device 40, i.e. the joystick. The data are converted from analog to digital in an A/D converter 102. The position sensors 56 provide the position data of the reels 52. The position data are transformed into a current X, Y position of the 24 movable central member and a current X, Y, Z position of the bait device in box 104. The data from the user input device 40 are fed to a routine 105 via 103. The routine 103 applies the calibration of the joystick and applies a damping in case of a too abrupt change of the input. The current position of the central member and bait device is also fed to the routine 105.

The routine 105 exports the current position of the central member via box 106.

On the basis of the combination of the user input data and the current position, a new target position X, Y is computed in boxes 108 (for X coordinate) and 109 (for Y coordinate). This is the target position to which the central member 24 should move. The boxes 108, 109 comprise a check whether the new target position lies within a safe area, as is explained further below.

In box 112, the new position X, Y, Z is known. The target cable lengths are next computed in box 114. On the basis of the target cable lengths, the target winch speeds are computed in box 116 and subsequently the target accelerations in box 118. A check is performed on the target cable length in check 120. If the cable lengths lie outside a threshold value, the system aborts in box 122. A further check is performed on the target winch accelerations in check 124. If the target winch accelerations are greater than a threshold value, the accelerations are limited to the threshold value in box 126.

Turning to FIG. 4, the guide ring position from box 106, the winch speeds from box 125 are combined with certain fixed parameters relating to the winches from box 128.

These parameters are used to compute the static torque in box 130, the dynamic torque in box 132 and the system torque in box 134. The static torque is the torque which is required to maintain the central member at the required altitude. The system torque is the required torque to overcome friction losses during the movement. The dynamic torque is the torque which is required to create the desired acceleration or deceleration of the central member.

These torques are added into a total target torque for each winch in box 136. In box 138 the maximal torque for each winch is determined. In check 140, a check is performed whether the total target torque exceeds the maximal torque for each winch. If yes, then in box 142 the total torque is lowered to the maximal torque. If no, then no reduction in torque takes place. The maximal torque may be dynamic and dependent on a degree of overload of the motorized winches which has taken place in the recent history. If the winches have been overloaded recently, the maximal torque may be decreased automatically by the control algorithm, assuming that the winches need cooling off. After a certain time period, the maximal torque may be raised again to its original level, under the assumption that the winches will have cooled off by then.

In box 144, the target winch speeds from box 106 and the target torques from box 142 are combined and sent to each motor controller 51 of the four winches 20.

Each motor controller 51 has a check 150 in which the current speed of the winch is verified. If the winch is unwinding the cable, the winch is controlled on the basis of the target torque in box 152. This prevents the cable from going slack. In this way the central member 24 is maintained at a minimum altitude, so that the animals cannot reach it. If the speed is positive, i.e. if the cable is being wound onto the reel 52, the winch is controlled on the basis of the target speed in box 154.

Each motor controller 51 has a PI-controller for the speed and a PI-controller for the torque. Depending on whether the winch is controlled on the speed or on the torque, the appropriate PI-controller is used.

For the bait device winch 33 with which the altitude of bait device 36 is controlled, in box 145 the new target position of the bait device 36 is determined. On the basis of the new target position, the target winch speed of the bait device winch is determined in box 146. Subsequently, via box 147 the target winch speed is fed to the motor controller 51 of the bait device winch 33 in box 148. The bait device winch only uses the PI-controller for speed.

Figures 5A, 5B:
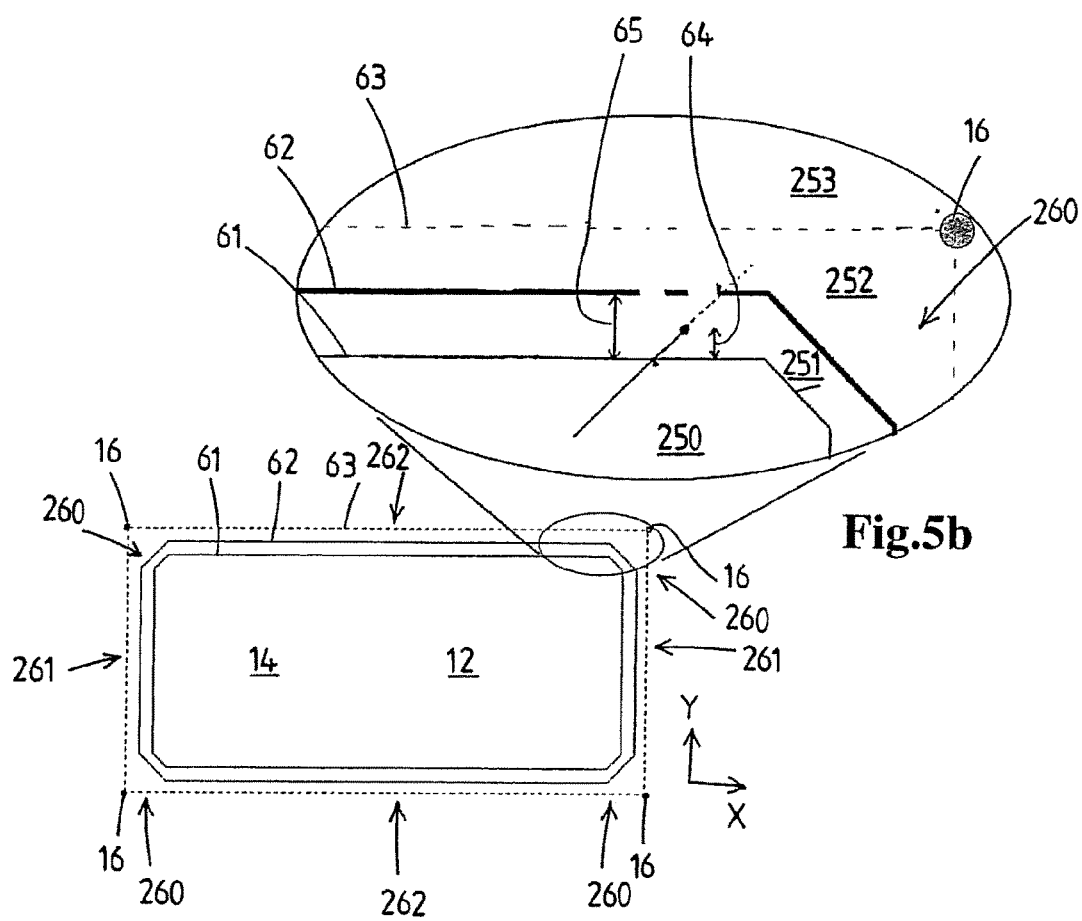
FIG. 5A shows a top view of the exercise area with the safety boundaries.
FIG. 5B shows an enlarged view of a corner of the exercise area with the safety boundaries.

Turning to FIGS. 3, 5A and 5B, the exercise area is bounded by a first safety boundary 61, a second safety boundary 62 and a third safety boundary 63. The boundaries 61, 62 and 63 define a safe area 250, a "slow-down area" 251, a "stop area" 252 and an "abort area" 253. In the boxes 108 and 109 shown in FIG. 3, checks are performed on the location of the central member 24.

In box 210, a check is performed whether the target position lies outside the first safety boundary 61. If no, then the target position lies within safe area 250 and in box 212 it is determined that no reduction in the speed of the winches is performed. If yes, then in box 214 a check is performed whether the target position lies outside the outer safety boundary 63. If yes, then the target position lies in the abort area 253 and the system aborts in 214. If no, then another check is performed in box 218 whether the target position lies in the stop area 252, i.e. between safety boundary 62 and 63. If yes, then the speed of the winches and therefore speed of the central member 24 in the direction away from the safety boundary 62 is reduced to zero in box 220.

If no, then it follows in box 222 that the target position lies in the slow-down area 251 between safety boundary 61 and 62. In this case the speed is limited proportionally according to the relative distance of the target position to the boundaries 61 and 62 in box 223. The closer the target position lies to boundary 62, the more the speed is reduced in the direction towards that boundary 62.

As is clear from FIG. 5B, the boundaries 61 and 62 have a shape of a polygon with truncated corners, in particular the shape of a rectangle or square with truncated corners.

Figure 6A:
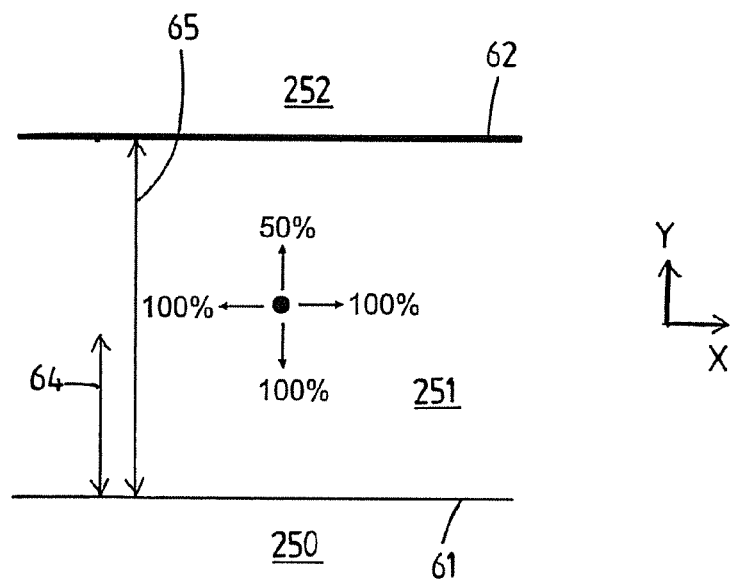
FIG. 6A shows the speed reduction between two safety boundaries.
Figure 6B:
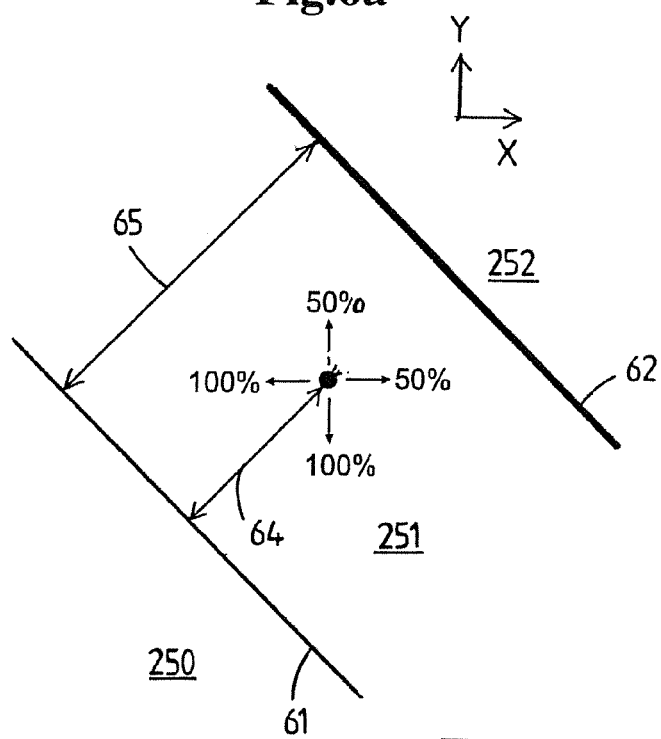
FIG. 6B shows the speed reduction between two safety boundaries near a corner.

Turning to FIG. 6A, it is shown that along the sides 262, the speed is reduced in the Y-direction only. It will be clear that along the sides 261, the speed is reduced in the X-direction only. If distance 64 is equal to 50 percent of distance 65, then the speed in a direction away from boundary 61 is reduced by 50 percent. Turning to FIG. 6B, it is shown that at the truncated corners 260, the speed is reduced in two directions X and Y, depending on the relative distances 64 and 65. If distance 64 is equal to distance 65, the boundary 62 is reached and the speed is decreased by 100 percent in the direction towards boundary 62.

Figure 7:
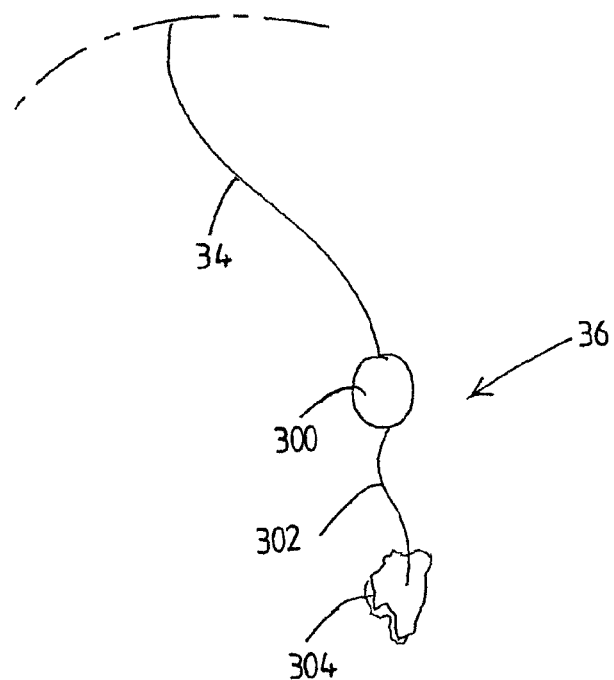
FIG. 7 shows a diagrammatic view of an embodiment of a bait device.

Turning to FIG. 7, the bait device may comprise a dead weight 300, a bait 304 and a consumable rope 302. The dead weight is connected to an end of the bait device cable 34. The bait is connected to the dead weight via the consumable rope. In this way, the animal can grab the bait 304 with his teeth and tear the bait 304 from the dead weight by breaking the rope without any risk to his health. The dead weight is separate from the bait and allows fast vertical movements.

The consumable rope may be 20-100 cm in length. The consumable rope 302 may be substantially weaker than the bait device cable 34 in order to allow relatively easy breaking of the consumable rope. The words "consumable rope" are to be interpreted broadly and comprise any consumable chord, cable, line or other elongate member suitable for this purpose.

Other embodiments of the bait device are also conceivable.

Operation

In operation, a bait is connected to the bait device, and the bait device is moved in the X-direction, Y direction and Z-direction with the winches. The operator may visually watch the animals and play with them by moving the bait in front of the animals. The operator may stand between two peripheral supports 16 and control the bait visually. If a sensor is used to sense the position of the animals, the sensor may be a camera 60.

Because of the bait device winch, a very fast upward motion is possible, luring the animals to jump to catch the bait. The animals cannot become entangled in the cables 22, because they are too high above the ground. The bait device may follow an irregular trajectory through the exercise area.

The movable central member is maintained at a relatively constant altitude above the floor and is essentially only moved in an X-direction and Y-direction, and the movement of the bait device in the Z-direction is only achieved with the bait device winch and the bait device cable.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising i.e., open language, not excluding other elements or steps.

It will be understood that not all stated objects of the invention will be achieved by each embodiment.

Any reference signs in the claims should not be construed as limiting the scope of the claims or the invention. It will be recognized that a specific embodiment as claimed may not achieve all of the stated objects.

The mere fact that certain measures are recited in mutually different dependent claims does not indicate that a combination of these measures cannot be used to advantage.

The invention claimed is:

1. A system for exercising and amusing animals, in particular predators, the system comprising:
   at least three peripheral supports which are elevated above a floor on which the animals move, wherein, when seen in top view of the floor, the at least three peripheral supports are spaced apart from one another and together define an exercise area, wherein each of the at least three peripheral supports is associated with a respective motorized winch, and wherein a cable is spooled on each winch,
   a movable central member, wherein, for each winch, the cable extends from the winch via one of the at least three peripheral supports to the movable central member, whereby the movable central member is suspended from the cables above the floor,
   a bait device configured to hold a bait, the bait device being provided at a distance below the movable central member via a bait device cable, and
   a control unit associated with the winches and configured to control each winch to wind or unwind the cable spooled on each winch for moving the bait device in the exercise area,
   wherein the movable central member comprises a cable guide, and
   wherein the bait device cable extends from a bait device winch via an upper support and through the cable guide to the bait device and has a freedom of movement relative to the cable guide in order to vary a vertical Z-position of the bait relative to the movable central member.

2. The system according to claim 1, further comprising a motorized bait device winch, wherein the bait device cable is spooled on the bait device winch, wherein the bait device cable extends from the bait device winch via the upper support and via the central member to the bait device, and wherein the bait device is movable in a vertical direction relative to the central member by winding or unwinding the bait device cable by the bait device winch.

3. The system according to claim 2, wherein the upper support is located higher than the at least three peripheral supports and above the floor.

4. The system according to claim 2, wherein the bait device winch is positioned to a side of the exercise area, when seen in top view.

5. The system according to claim 1, wherein the bait device is not supported in a vertical Z-direction by the movable central member.

6. The system according to claim 1, wherein the control unit is configured to control each of the winches for unwinding each of the cables for each of the winches on the basis of a target torque and to control each of the winches for winding each of the cables for each of the winches on the basis of a target speed, and wherein the control unit is configured to control the bait device winch on the basis of a target speed, regardless whether the bait device winch winds or unwinds the bait device cable.

7. The system according to claim 6, wherein the control unit sends control data to each winch, wherein the control data comprises speed data relating to the target speed of the winch and torque data relating to the target torque of the winch, and wherein a motor controller of the winch is constructed to control the motor of the winch on the basis of the target speed when winding the cable and on the basis of the target torque when unwinding the cable.

8. The system according to claim 6, wherein the target torque is calculated by adding:
a static torque which is required to maintain the central member at a required altitude, and
a system torque which is required to overcome friction losses during the winding or unwinding, and
a dynamic torque which is required to create desired acceleration or deceleration of the central member.

9. The system according to claim 1, further comprising a user input device which is connected to the control unit, wherein a user manually controls the movement of the bait in X, Y and Z directions with the user input device.

10. The system according to claim 1, wherein the bait device comprises a dead weight, a bait and a consumable rope, wherein the dead weight is connected to an end of the bait device cable, wherein the bait is connected to the dead weight via the consumable rope, and wherein the consumable rope is weaker than the bait device cable.

11. The system according to claim 1, wherein the control unit is configured to verify if a target position of the central member lies within a predefined safe area defined by a first safety boundary, in which case speeds of the winches associated with the at least three peripheral supports are not reduced, and to verify if the target position lies in a slow-down area which extends around the safe area and which lies between the first safety boundary and a second, wider safety boundary and to slow down speed of the central member in a direction away from the first safety boundary on the basis of a distance of the central member to that first safety boundary, and to completely stop movement of the central member in a direction away from the second safety boundary when the target position of the central member lies outside the second safety boundary, and to abort operation of the central member if the target position of the central member lies outside a third safety boundary which is wider than the first and second safety boundaries and which is defined by the position of the at least three peripheral supports.

12. The system according to claim 1, wherein the cable guide comprises a ring.

13. A method of exercising or amusing animals, in particular predators, comprising:
providing the system of claim 1,
connecting the bait to the bait device, and
moving the bait device in an X-direction, a Y-direction and a Z-direction with the winches.

14. The method according to claim 13, further comprising:
moving the bait in a horizontal X-direction and Y-direction with the cables and the winches associated with the at least three peripheral supports, while maintaining the central member at a constant altitude above the floor, and
moving the bait in the Z direction with the bait device cable and the bait device winch.

15. A system for exercising and amusing animals, in particular predators, the system comprising:
at least three peripheral supports which are elevated above a floor on which the animals move, wherein, when seen in top view of the floor, the at least three peripheral supports are spaced apart from one another and together define an exercise area, wherein each of the at least three peripheral supports is associated with a respective motorized winch, and wherein a cable is spooled on each winch,
a movable central member, wherein, for each winch, the cable extends from the winch via one of the at least three peripheral supports to the movable central member, whereby the movable central member is suspended from the cables above the floor,
a bait device configured to hold a bait, the bait device being provided at a distance below the movable central member, and
a control unit associated with the winches and configured to control each winch to wind or unwind the cables for moving the bait device in the exercise area,
wherein each winch comprises:
a motor,
a motor controller,
a spool for the cable,
a transmission arranged between the motor and the spool, and
wherein each winch comprises a position sensor for measuring a rotational position of the winch, and wherein the control unit is configured for receiving position data from the position sensors and configured to compute current lengths of the cables and to determine current X and Y positions of the movable central member and current X, Y, Z positions of the bait device on the basis of the position data.

16. A method of exercising or amusing animals, in particular predators, comprising:
providing the system of claim 15,
connecting a bait to the bait device, and
moving the bait device in an X-direction, a Y-direction and a Z-direction with the winches.

17. The method according to claim 16, further comprising:
moving the bait in a horizontal X-direction and Y-direction with the cables and the winches associated with the at least three peripheral supports, while maintaining the central member at a constant altitude above the floor, and
moving the bait in the Z-direction with the bait device cable and the bait device winch.

* * * * *